United States Patent [19]

Charpentier

[11] Patent Number: 4,813,671
[45] Date of Patent: Mar. 21, 1989

[54] RASTER MONITOR FOR VIDEO GAME DISPLAYS

[75] Inventor: Albert J. Charpentier, Hatfield, Pa.

[73] Assignee: Commodore Business Machines, Inc., West Chester, Pa.

[21] Appl. No.: 910,051

[22] Filed: Sep. 22, 1986

Related U.S. Application Data

[63] Continuation of Ser. No. 455,975, Feb. 27, 1983, abandoned.

[51] Int. Cl.$^4$ .......................... G09G 1/16; A63F 9/22
[52] U.S. Cl. .......................... 273/1 E; 273/DIG. 28; 340/721; 340/725
[58] Field of Search ............ 273/1 E, 85 G, DIG. 28; 434/307, 323; 324/73 R; 307/355, 356, 328, 358; 340/146.2, 723–726, 729; 358/22, 107

[56] References Cited

U.S. PATENT DOCUMENTS 4,398,189 8/1983 Pasierb, Jr. et al. ................ 340/721
4,562,365 12/1985 Redfield .............................. 307/453

Primary Examiner—Maryann Lastova
Attorney, Agent, or Firm—John J. Simkanich

[57] ABSTRACT

A monitoring circuit incorporated into a video game display device is operated responsively to first and second non-overlapping clock pulses and monitors raster line status in comparison to a stored raster address and provides a high speed raster scan interrupt when that address is achieved, triggering a SPRITE or other feature(s) display.

9 Claims, 1 Drawing Sheet

RASTER MONITOR FOR VIDEO GAME DISPLAYS

This application is a continuation of a pending U.S. application Ser. No. 455,975, filed Feb. 27, 1983, now abandoned, and directed to the same subject matter.

BACKGROUND OF THE INVENTION

This invention relates to monitoring circuits for a video game display device and specifically raster scan monitors for such display device where any of a plurality of objects are to be displayed at certain screen locations specified according to stored instruction words.

An object of this invention is to provide a high speed monitor or raster scan addresses.

A second object of this invention is to provide such a monitor which does not load down the raster address element.

A further object of this invention is to provide such a monitor which interrupts the background sweep to load and display a SPRITE or other feature display.

SUMMARY OF THE INVENTION

The objects of this invention are realized in a monitoring circuit for raster scan in a video game display circuit which is implemented in large scale integrated circuitry (LSI) utilizing NMOS technology. A raster line address or location is loaded into a register for each line on which the video display information is to be varied from the preestablished background display. These stored addresses are sequentially loaded responsive to a first clock pulse.

A second, non-overlapping clock pulse is utilized to initiate a comparison operation with the instantaneous raster line information to initiate a change in the display instructions for that line.

DESCRIPTION OF THE DRAWINGS

The features, operation and advantages of the invention can be learned from a reading of the following detailed description of the invention with the accompanying drawings in which like numerals refer to like elements and in which.

DETAILED DESCRIPTION OF THE INVENTION

A video game device provides a color display to the operator or player comprised of a background, usually non-moving; of SPRITES, i.e. movable objects, usually player responsive; and of other features, either fixed or moving, usually player non-responsive.

The background to be displayed is loaded into the video game device from a program and usually comprises a background data instruction set.

The video, line-by-line display driver is operated according to the background data instruction set unless this format is interrupted to display SPRITE or other feature information.

SPRITE and other feature data is loaded into the video game device from a program, and as with the background data is dependent upon the "game" being played. The display addresses for SPRITES and other features, however, can be varied by the processor unit of the video game device or by controlled inputs. Instantaneous SPRITE and other feature addresses are held in an address register.

Information processing within the video game device utilizes two non-overlapping clock pulses.

Figure 1:
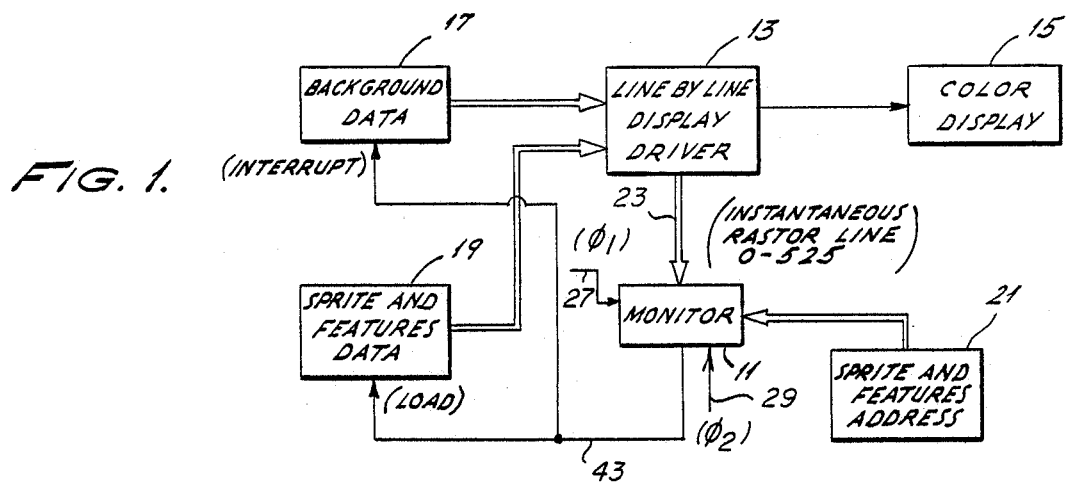
FIG. 1 is a block diagram of the video game display device and monitoring circuit invention interconnection.

The monitor 11, FIG. 1, of the invention receives instantaneous raster line information from the display driver 13, which driver 13 supplies signals to a color display 15, such as a color television.

Background data is stored in an active memory 17 which constantly feeds display information to the display driver 13.

SPRITE display data and data defining other display features is held in a second active memory 19.

Current or instantaneous addresses for SPRITES and other features are clocked into a third active memory 21.

The memory 21 is connected to the monitor 11. When the raster line information received from the display driver 13 equals the raster line address stored in memory 21 a signal is generated which interrupts the background data from the first memory 17 to the display driver 13 and substitutes (loads) the SPRITE or other feature data from the second memory instead.

Figure 2:
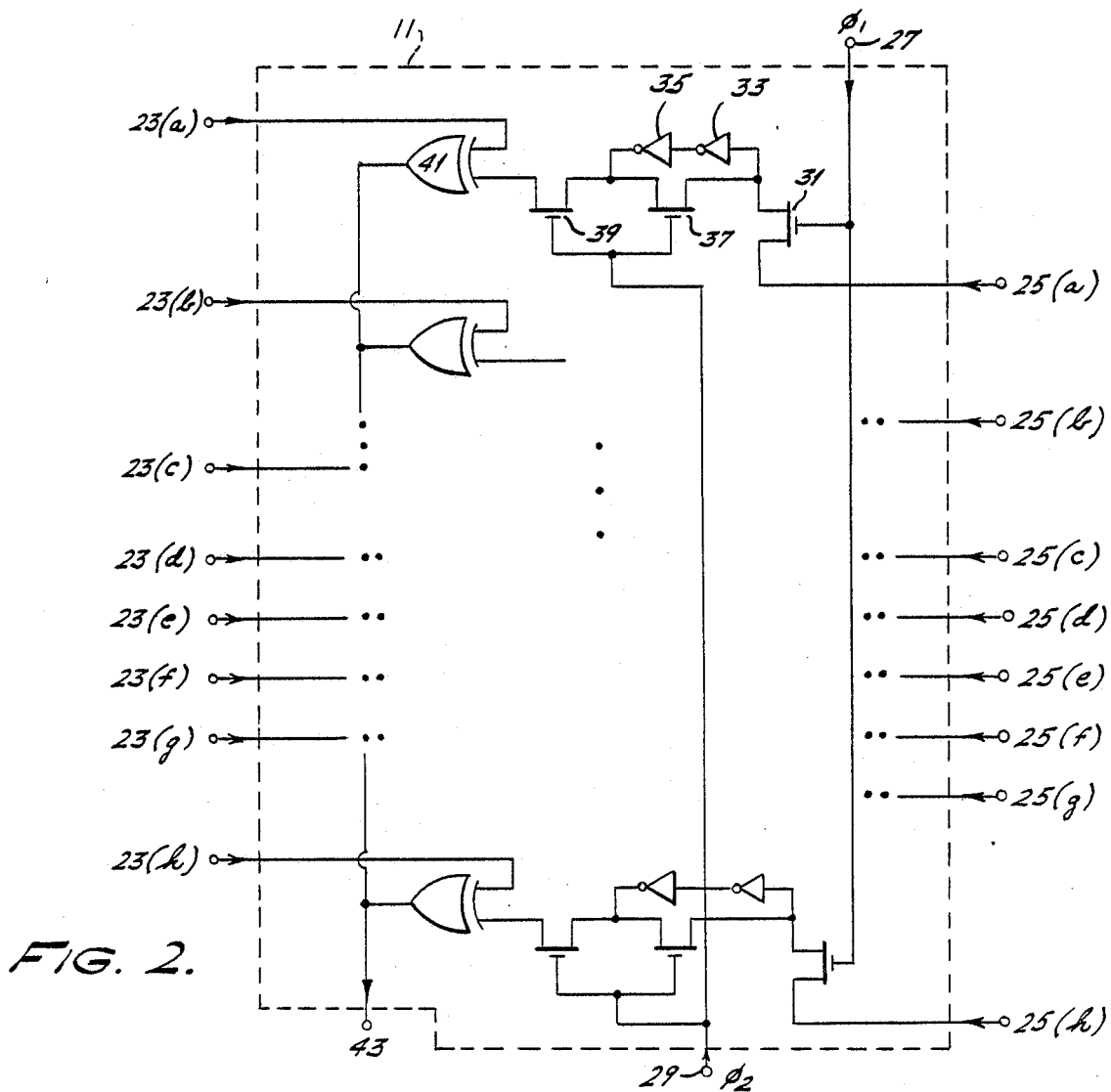
FIG. 2 is a circuit diagram of the monitoring circuit invention.

The monitor 11 is an 8 bit word device, FIG. 2, but can be tailored to any size. Instantaneous raster line location information from the display driver 13 is connected onto the inputs 23(a) through 23(h). SPRITE or other feature address words from the third memory 21 appears on the inputs 25(a) through 25(i). Each letter "a" through (h), designates a repsective bit in the 8 bit word processing.

The signals on the inputs 25(a) through (h) are clocked into the circuit storage by a first clock pulse ($\Phi$1) appearing on node 27. A comparison is made with the inputs 23(a) through (h) responsive to a second clock pulse ($\Phi$2) appearing on node 29.

The 25 input node is connected to the drain pin of a first field effect transistor, FET 31, whose gate pin is connected to node 27.

The source pin of FET 31 is feed the two inverting amplifiers 33, 35 connected in series.

An FET 37 is connected as a recirculating gate feedback, drain-to-source pin across the two amplifiers 35, 33. An FET 39 is connected on the output of the amplifier 35 to input a comparator 41. The signals on the 23 input node are also connected to the comparator 41.

The interrupt signal is generated as the comparator 41 output to node 43. The FETs 37, 39 are switched to conduction by the second clock pulse ($\Phi$2) on node 29 by a connection to the gate pins of the FETs 37, 39.

This architecture is duplicated for each bit to be processed with the plural comparators 41 output connected in common to the node 43.

The paired amplifiers 33, 35 form a register which is loaded responsive to the first clock pulse ($\Phi$1). The register data is recirculated and "dumped" responsive to the second clock pulse ($\Phi$2).

The description above is intended as illustrative and is not to be read in the limiting sense. Many changes could be made in the invention without departing from the intent and scope thereof.

What is claimed is:

1. A raster scan monitor circuit connectable within a video game device, said video game device having a video display, a line by line display driver circuit connected to the display and providing raster line information, a first active memory holding background display data and having an interrupt signal input, said first active memory being connected to said line by line display driver circuit, and feeding said background data thereto, a second active memory holding sprite and features data and having a load signal input said second active memory being connected to said line by line display drive for feeding said sprite and features data thereto, and a third active memory holding sprite and features raster line addresses, and first and second non-overlapping clock pulses present, comprising:

a monitor circuit having a first input connected to said line by line display driver circuit for reading the raster line information therefrom and having a second input connected to said third memory for reading the sprite and features raster line addresses therefrom, said monitor circuit operating to compare said raster line information from said line by line display driver circuit to said sprite and features raster line addresses and having an output connected to said first memory interrupt signal input and to said second memory load signal input for simultaneously interrupting the transfer of said first memory data to said line by line display driver circuit and for enabling the transfer of said second memory data to said line by line display driver circuit in the presence of a signal on said monitor circuit output; and wherein said monitor circuit has its input gated responsive to said first clock pulse and has its operation gated responsive to said second clock pulse.

2. The circuit of claim 1 wherein said monitor circuit connection to said third memory is a plural line signal bus connection; and wherein said monitor circuit includes a plurality of gate circuits, each said gate circuit is connected to one of said plural line bus connections wherein each of said plurality of gate circuits is connected to operate responsively to said first clock pulse for passing a signal.

3. The circuit of claim 2 wherein said monitor circuit includes a plurality of identical circuits operating in parallel to process a plural bit word, each comprising:

a signal storage circuit;

first switch means comprising a said gate circuit connected on the input of said signal storage circuit and operative responsively to said first clock pulse for selectively loading said storage device, said first switch means being connected to said third memory;

second switch means connected on the output of said signal storage circuit and operative responsively to said second clock pulse for selectively unloading said signal storage circuit;

third switch means connected across said signal storage circuit for recirculating information thereinto, said third switch means being connected to operate responsive to said second clock pulse; and means for comparing the information unloaded from said signal storage circuit through said second switch means and said raster line information, said comparing means being connected on one input to said line by line display driver circuit and on another input to said second switch means output, and wherein said comparing means output is connected to said first memory and to said second memory.

4. The circuit of claim 3 wherein said storage circuit comprises a register; wherein said first, second and third switch means each comprise a first, second and third transistor switches, respectively and wherein said comparing means comprises a comparator.

5. The circuit of claim 4 wherein said register comprises the series connection of a first and a second amplifiers; and wherein said first, second and third transistor switches are a first, second and third FET, respectively.

6. The circuit of claim 5 wherein said first FET is connected on its gate pin to said first clock pulse, is connected on its drain pin to said third memory and is connected on its source pin to said first amplifier input.

7. The circuit of claim 6 wherein said second FET is connected on its gate pin to said second clock pulse, is connected on its drain pin to said second amplifier output and is connected on its source pin to said first amplifier input.

8. The circuit of claim 7 wherein said third FET is connected on its gate pin to said second clock pulse, is connected on its drain pin to said second amplifier output and is connected on its source pin to an input of said comparator; and wherein said comparator has another input connected to said line by line display driver circuit and its output connected to said first and said second memory circuits.

9. The circuit of claim 8 wherein multiple bit information is processed in parallel; said first, second and third FETs, said first and second amplifiers and said comparator being plurally duplicated to operate in parallel to process respective bits of said multiple bit information.

* * * * *

UNITED STATES PATENT AND TRADEMARK OFFICE
CERTIFICATE OF CORRECTION

PATENT NO. : 4,813,671

DATED : March 21, 1989

INVENTOR(S) : Albert J. Charpentier

It is certified that error appears in the above-identified patent and that said Letters Patent is hereby corrected as shown below:

Column 1, line 64, change "feature" to -- feature(s)-;

Column 2, line 32, change repsective" to -- respective--

Column 2, line 42, after "is" insert --connected to--.

Signed and Sealed this

Twenty-fourth Day of October, 1989

Attest:

DONALD J. QUIGG

Attesting Officer

Commissioner of Patents and Trademarks